United States Patent
Sukhija et al.

(10) Patent No.: US 11,962,703 B2
(45) Date of Patent: Apr. 16, 2024

(54) COOPERATIVE SESSION ORCHESTRATION

(71) Applicant: INTERNATIONAL BUSINESS MACHINES CORPORATION, Armonk, NY (US)

(72) Inventors: Sandeep Sukhija, Rajasthan (IN); Rajesh Kumar Saxena, Maharashtra (IN); Harish Bharti, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 17/650,258

(22) Filed: Feb. 8, 2022

(65) Prior Publication Data

US 2023/0254150 A1   Aug. 10, 2023

(51) Int. Cl.
*H04L 29/06* (2006.01)
*G16Y 30/10* (2020.01)
*H04L 9/32* (2006.01)

(52) U.S. Cl.
CPC ............ *H04L 9/3234* (2013.01); *G16Y 30/10* (2020.01)

(58) Field of Classification Search
CPC .............................. H04L 9/3234; G16Y 30/10
USPC ....................................................... 713/168
See application file for complete search history.

(56) References Cited

U.S. PATENT DOCUMENTS 7,999,685 B2 * 8/2011 Sanchez ................ H04L 9/0833
713/168
9,800,575 B1 * 10/2017 Lewis ................... H04L 9/3234
10,951,494 B1 * 3/2021 Gupta ..................... H04L 43/16
11,025,627 B2   6/2021 Li et al.
11,626,993 B2 * 4/2023 Zamani ............... H04L 41/0893
713/168

(Continued)

FOREIGN PATENT DOCUMENTS

WO   2019209184 A1   10/2019

OTHER PUBLICATIONS

Christidis, "Blockchains and Smart Contracts for the Internet of Things", May 10, 2016, IEEE, pp. 2292-2301 (Year: 2016).*

(Continued)

*Primary Examiner* — Piotr Poltorak
*Assistant Examiner* — Gregory A Lane
(74) *Attorney, Agent, or Firm* — Stosch Sabo; Matthew M. Hulihan; Heslin Rothenberg Farley & Mesiti PC

(57) ABSTRACT

Cooperative session orchestration includes devising a crypt for pre-distribution of tokens, distributing the tokens to member nodes of the network, based on a request from a delegate node of the network for brokerage of a session between the delegate node and a supplier node of the network, creating and sending, for each of a plurality of potential supplier nodes of the network, a respective individual puzzle, receiving, from each of one or more potential supplier nodes of the plurality of potential supplier nodes, a respective result obtained by the potential supplier node from solving the individual puzzle using the token distributed to the potential supplier, identifying, based on the receiving, candidate supplier node(s) of the one or more potential supplier nodes as a potential supplier for the session with the delegate node, and identifying to the delegate node the candidate supplier node(s) for the session with the delegate node.

20 Claims, 6 Drawing Sheets

(56) References Cited

U.S. PATENT DOCUMENTS

| | | | |
|---|---|---|---|
| 2009/0282243 A1* | 11/2009 | Rose | H04L 63/0435 |
| | | | 713/159 |
| 2013/0047243 A1* | 2/2013 | Radhakrishnan | H04L 63/0807 |
| | | | 726/9 |
| 2016/0269231 A1* | 9/2016 | Bahr | H04L 41/0866 |
| 2017/0155510 A1* | 6/2017 | Cloostermans | H04L 9/0894 |
| 2018/0198632 A1* | 7/2018 | Gajek | H04L 9/30 |
| 2019/0044734 A1* | 2/2019 | Lancashire | H04L 9/3247 |
| 2019/0165941 A1 | 5/2019 | Ray et al. | |
| 2019/0296915 A1* | 9/2019 | Lancashire | H04L 9/3247 |
| 2019/0334933 A1* | 10/2019 | Teshome | H04W 12/61 |
| 2020/0012527 A1* | 1/2020 | Hartsock | H04L 9/0825 |
| 2020/0201679 A1 | 6/2020 | Wentz | |
| 2022/0116418 A1* | 4/2022 | Rollet | H04L 9/0643 |

OTHER PUBLICATIONS

Dai, "Blockchain for Internet of Things: A Survey", 2019, IEEE, pp. 1-19 (Year: 2019).*

Mell, Peter, et al., "The NIST Definition of Cloud Computing", NIST Special Publication 800-145, Sep. 2011, Gaithersburg, MD, 7 pgs.

* cited by examiner

COOPERATIVE SESSION ORCHESTRATION

BACKGROUND

Many current network environments, for instance those with Internet-of-Things (IoT) devices at network edge, contain devices with differing functions and capabilities, including those that perform processing on behalf of other devices in transactional or request-response situations. For instance, different devices might have different levels of capabilities—some having more resourceful capabilities than others that are less resourceful. There exist situations in which resourceful capability is desired to perform a particular task, after the completion of which the resourceful capability may be made available for another task at a later point of time. Existing IoT orchestrations might utilize a network to establish communication between resourceful and resourceless devices.

SUMMARY

Shortcomings of the prior art are overcome and additional advantages are provided through the provision of a computer-implemented method. The method includes devising a crypt for pre-distribution of tokens to facilitate electronic communication sessions in a network. The method also includes distributing the tokens to member nodes of the network, where each member node receives a respective unique token of the tokens. Based on a request from a delegate node of the network for brokerage of a session between the delegate node and a supplier node of the network, the method creates, for each potential supplier node of a plurality of potential supplier nodes of the network, a respective individual puzzle for the potential supplier node based on the devised crypt, and sending the individual puzzle to the potential supplier node. The method receives, from each of one or more potential supplier nodes of the plurality of potential supplier nodes, a respective result obtained by the potential supplier node from solving the individual puzzle using the token distributed to the potential supplier. The method also identifies, based on the receiving, candidate supplier node(s) of the one or more potential supplier nodes as a potential supplier for the session with the delegate node. The method additionally identifies to the delegate node the candidate supplier node(s) for the session with the delegate node.

Further, a computer system is provided that includes a memory and a processor in communication with the memory, wherein the computer system is configured to perform a method. The method includes devising a crypt for pre-distribution of tokens to facilitate electronic communication sessions in a network. The method also includes distributing the tokens to member nodes of the network, where each member node receives a respective unique token of the tokens. Based on a request from a delegate node of the network for brokerage of a session between the delegate node and a supplier node of the network, the method creates, for each potential supplier node of a plurality of potential supplier nodes of the network, a respective individual puzzle for the potential supplier node based on the devised crypt, and sending the individual puzzle to the potential supplier node. The method receives, from each of one or more potential supplier nodes of the plurality of potential supplier nodes, a respective result obtained by the potential supplier node from solving the individual puzzle using the token distributed to the potential supplier. The method also identifies, based on the receiving, candidate supplier node(s) of the one or more potential supplier nodes as a potential supplier for the session with the delegate node. The method additionally identifies to the delegate node the candidate supplier node(s) for the session with the delegate node.

Yet further, a computer program product including a computer readable storage medium readable by a processing circuit and storing instructions for execution by the processing circuit is provided for performing a method. The method includes devising a crypt for pre-distribution of tokens to facilitate electronic communication sessions in a network. The method also includes distributing the tokens to member nodes of the network, where each member node receives a respective unique token of the tokens. Based on a request from a delegate node of the network for brokerage of a session between the delegate node and a supplier node of the network, the method creates, for each potential supplier node of a plurality of potential supplier nodes of the network, a respective individual puzzle for the potential supplier node based on the devised crypt, and sending the individual puzzle to the potential supplier node. The method receives, from each of one or more potential supplier nodes of the plurality of potential supplier nodes, a respective result obtained by the potential supplier node from solving the individual puzzle using the token distributed to the potential supplier. The method also identifies, based on the receiving, candidate supplier node(s) of the one or more potential supplier nodes as a potential supplier for the session with the delegate node. The method additionally identifies to the delegate node the candidate supplier node(s) for the session with the delegate node.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1A:
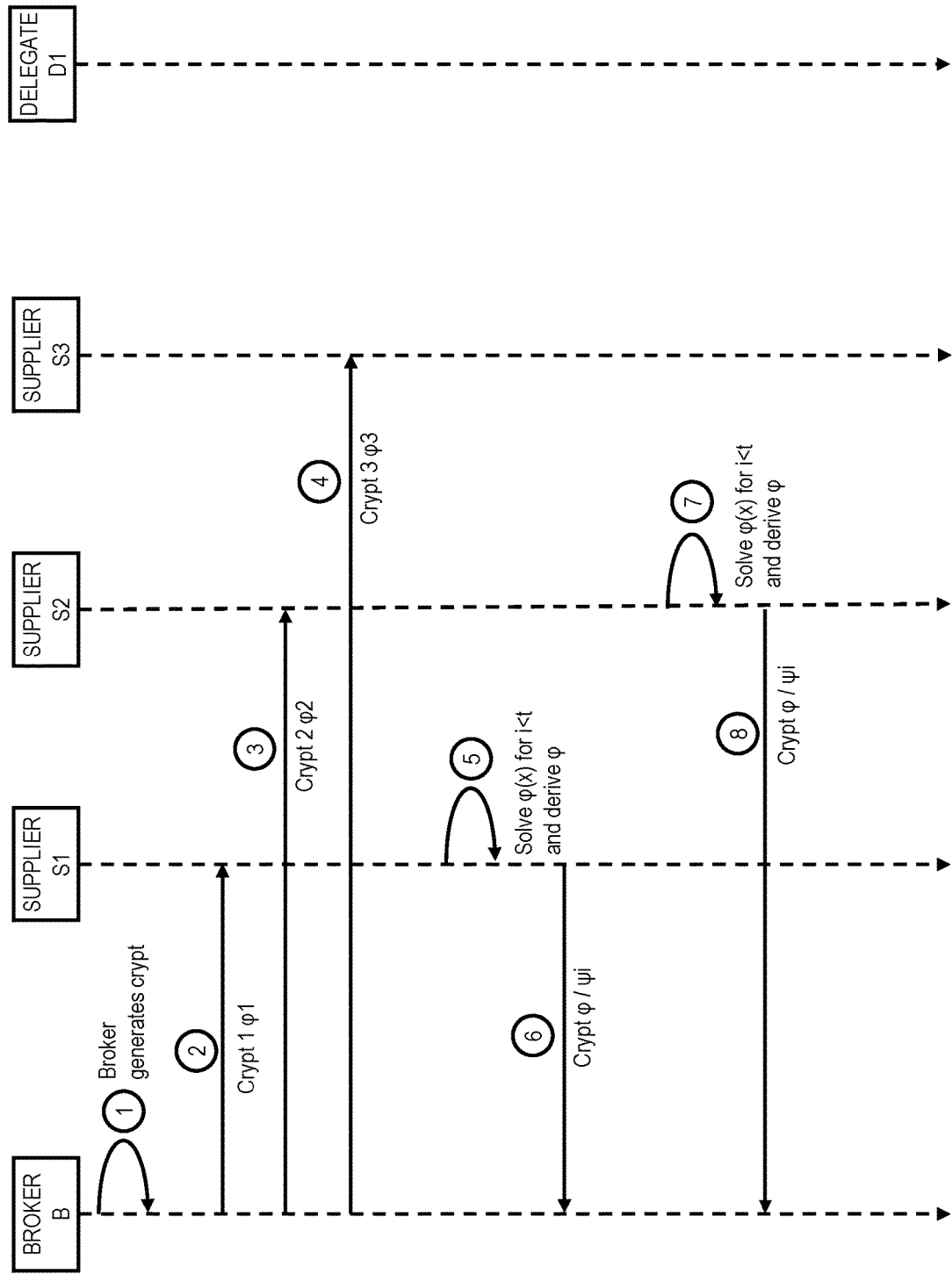
FIGS. 1A-1B depict an example activity flow by a broker, delegate, and suppliers for establishing a session between the delegate and a supplier, in accordance with aspects described herein.

Provided in accordance with aspects described herein are approaches for reliable, secure, and high performing, edge-side, cooperative model-based orchestration on public networks without dedicated trustee nodes. A session can be established between a supplier device (interchangeably referred to herein as a "resourceful device") and a delegate (interchangeably referred to herein as a "resourceless device" or "requester") based on the supplier's availability and using a trusted resource allocation method with minimal computational cost and computing capability.

Some aspects discussed herein create a 'non-obligatory' network for participating devices to interact in discrete, relatively small transactional exchanges. In a non-obligatory arrangement, devices can 'opt' in and out in terms of participation in sessions as they desire. This is in contrast to a more traditional 'obligatory' network arrangement incorporating agreed-upon protocols and unique identifiers for persistence on the network and open communication between devices. A non-obligatory and cooperative membership driven model as described herein helps to reduce network overhead that might otherwise be incurred in an obligatory network, enabling efficient ad hoc assembling and dismantling of network existence and participation via individual sessions. Current approaches do not provide methods to establish a session between a resourceful device and resourceless device in a network based on the resourceful device's (supplier's) availability using a trusted resource allocation method.

With respect to session (e.g. for a transaction) creation, performance, termination: (i) a reliability aspect ensures that started transactions are finished, (ii) a security aspect ensures that, although membership in the network is non-obligatory, there is some method/mechanism to distinguish between legitimate actors (devices, nodes) and non-legitimate (e.g. misbehaving, malicious, imposter, etc. —commonly referred to as "byzantine" nodes) actors, (iii) a high-performance aspect refers to the ability for many simultaneous/contemporaneous sessions, perhaps involving some of the same devices, while maintaining accuracy, (iv) an edge-side cooperative model-based aspect ensures that participating devices representing themselves as participants/members will support transaction fulfillment, (v) a public network aspect refers to the fact that devices need not create individual private networks and can remain on a common public (as an example) network for the duration of their participation/membership, and (vi) a 'without dedicated trustee node' aspect ensures the memberships are legitimate and authentic without dedicated trusted node(s).

Some examples are presented herein in the context of a network of devices in wireless communication with each other to poll and potentially communicate with nearby devices in a surrounding vicinity. Such wireless communication can be supported by any of varying technologies and protocols, examples of which include WiMAX, ZigBee, Bluetooth, Z-Wave, WiFi, 5G, etc.). Though wireless communication may be typical, aspects apply to networks in which devices are in wired and/or wireless communication with each other.

Complexities arise when many—potentially hundreds or thousands—of devices in a vicinity of each other are not directly trusted but it is desired for them to freely allocate their resources to perform tasks based on delegate-supplier request and response sessions. Orchestration is desired and provided herein to allocate suppliers to delegates in which a session will be established between a supplier and delegate with minimal computational cost and computing capability. In a heterogenous public network, blind trust of other devices is generally not acceptable for any secure and reliable operations. To establish trust, aspects described herein build a cooperative operative without the need of dedicated trustee node(s) on the edge side.

Approaches are presented to establish a session between a delegate device (a 'resourceless' device, which may be an IoT device as an example) and supplier device (e.g. 'resourceful' device) at minimal computational cost and computing capability. The session can be established using a trusted allocation method. An example environment is an IoT infrastructure that interconnects heterogeneous nodes as resources with different capabilities and constraints (computing power, energy, etc.). Three types of resources involved in establishing a session as described herein to perform task(s) are:

(i) Delegate (requester; resourceless device)—Relatively highly resource-constrained node. May be labeled 'resourceless' despite having at least some, relatively small, processing capability. Example delegates are unable to support computation cost of more complex cryptographic operations but require security more advanced than that acceptable for even less intelligent nodes. Some very function-specific IoT devices may be delegates, e.g. for instance an internet-connected water sprinkler head or local sprinkler controller to control the head.

(ii) Broker—Less resource-constrained than a delegate and able to perform more complex cryptographic operations. Example nodes include dedicated, assisting servers/nodes belonging to a same local infrastructure and less impacted by energy and other constraints. Involved in creating for a delegate a session with supplier(s) with minimal computing cost.

(iii) Supplier (resourceful device)—A supplier of resource(s) for a delegate as part of the session. Can be a network server with high energy, computing power, and storage capabilities, though could be less resourceful but still capable of providing a resource. Could be a resourceful IoT device.

Though not a requirement, suppliers, delegates, and brokers involved in session establishment may be selected from a collection of network devices that all sit in a common neighborhood on the network. 'Neighborhood' may be associated with a geographic scope or other boundary. For example, a neighborhood/vicinity could be a radius of 50 meters surrounding a center point (such as a requester) and there may be thousands of network devices in that vicinity—one or more brokers and many suppliers (and other delegates). At times, a supplier for one session might be a delegate for another session. In this regard, 'resourceless' and 'resourceful' may be relative terms within the context of the session and not necessarily a reflection of the overall capabilities of the device. For instance, a relatively high-performance system might be 'resourceless' in the sense of lacking a basic sensor that another, relatively weak (in terms of computing power) device possesses. The sensor-possessing device may be the resourceful (supplier) device in a session while the 'resourceless' device is the one that, although high-performing, lacks such sensor capability.

In one aspect, proposed is a solution that establishes of a session between a resourceless device and a resourceful device at minimal computational cost and computing capability. The method can establish this session by creating a trusted allocation method where:

(i) there are n number of potential suppliers;
(ii) the allocation of a supplier for the session is made in real-time based on supplier availability;
(iii) before assignment to complete the task, suppliers need to be authenticated by a broker with low computing cost;
(iv) in examples, one of the suppliers plays the role of the broker at least for purposes of the session and facilitates the session between the delegate and supplier.

While example sessions discussed herein are between a delegate and one supplier, a session may involve more than one supplier at the request of the delegate. The delegate might request something from one supplier via another supplier, for instance, or might request that two (or more) suppliers each provide a respective something that the delegate needs. Additionally, examples herein may focus on single transaction sessions (e.g. one request followed by one response and then termination) instead of long, stateful sessions so that for each single instruction/request, the network is defined, and the resources create hop-based sessions to provide the resource or service that is requested for the dispensation of the network objective. However, it is noted that a session might involve several back-and-forth communications between the delegate and supplier(s).

A basic example application is as follows: Assume it is desired to control lawn watering based on current outdoor temperature. A homeowner has inground lawn sprinkler heads installed on the property and wants the lawn to be watered based on outdoor temperature, for instance to activate the sprinkler heads to spray water when the outdoor temperature is above a set threshold, or to tailor the amount of time the sprinklers remain on based on outdoor temperature (say, 10 minutes when cooler than a threshold and 45 minutes when hotter than the threshold). Programmable logic may be installed to control turn turning on and off the sprinkler system according to outdoor temperature. The sprinkler heads, in-ground valve box, and/or a controller in the garage, as examples, may include such intelligence. Assume further that there is no thermometer included as part of the sprinkler system, the current temperature reading therefore is to be supplied by some other device, and that there are nearby network-connected outdoor thermometers. In this example, the sprinkler system (heads, value box, or controller in the garage) is the delegate and a smart thermometer is a supplier. The two are to establish a session in which the sprinkler system requests the current temperature from the thermometer and the thermometer supplies a response, after which the session ends. A broker is used to identify to the delegate a pathway to the supplier. The broker is a device with at least some limited computational ability to, for example, send/receive messages and perform some mathematic calculations like generation of a crypt and dividing by token/keys as explained herein.

The devices in the vicinity may be part of a cooperative membership network that includes devices into the cooperative in some initial stage, such as through the trusted delivery of tokens. A token is known and provided, and used to solve crypts that are created by a member of the network (e.g. a broker) based on a known set of keys. Suppliers may solve the crypt and provide an answer back to the broker to establish trust. By way of simplified and basic example, assume a crypt operative is the number 24 and the distributed tokens are divisors/factors (e.g. 2, 3, 4, 6, 8, 12) of the number 24. Each member of the network may be dedicated one of these unique tokens. It is a relatively straight-forward task to perform a mathematical operation, such as a division/modulo operation using these numbers to determine whether a token is a factor of the crypt. If a supplier-member receives a crypt, divides by the member's token, and there is no remainder (i.e. the token is a factor of the crypt), then this proves that the member is trusted. A broker can distribute a crypt against which a supplier is to perform the operation and provide a result in return. The broker can also solve for what the result from the supplier is expected to be, and if the broker receives that result from the supplier, then the supplier is deemed trusted. From there, the broker can communicate information to the delegate that identifies the pathway to the proven supplier. The delegate can then initiate its own trust verification with the supplier to establish the session, as explained further below.

The above is an over-simplified (for practical applications) example of trust establishment between the broker and supplier because, in practice, the numbers involved will be much larger and more difficult for a human or even sophisticated computer to guess. The power of prime numbers and cryptography can be leveraged to ensure that non-conforming and therefore untrustworthy nodes will identifiable.

Figure 1B:
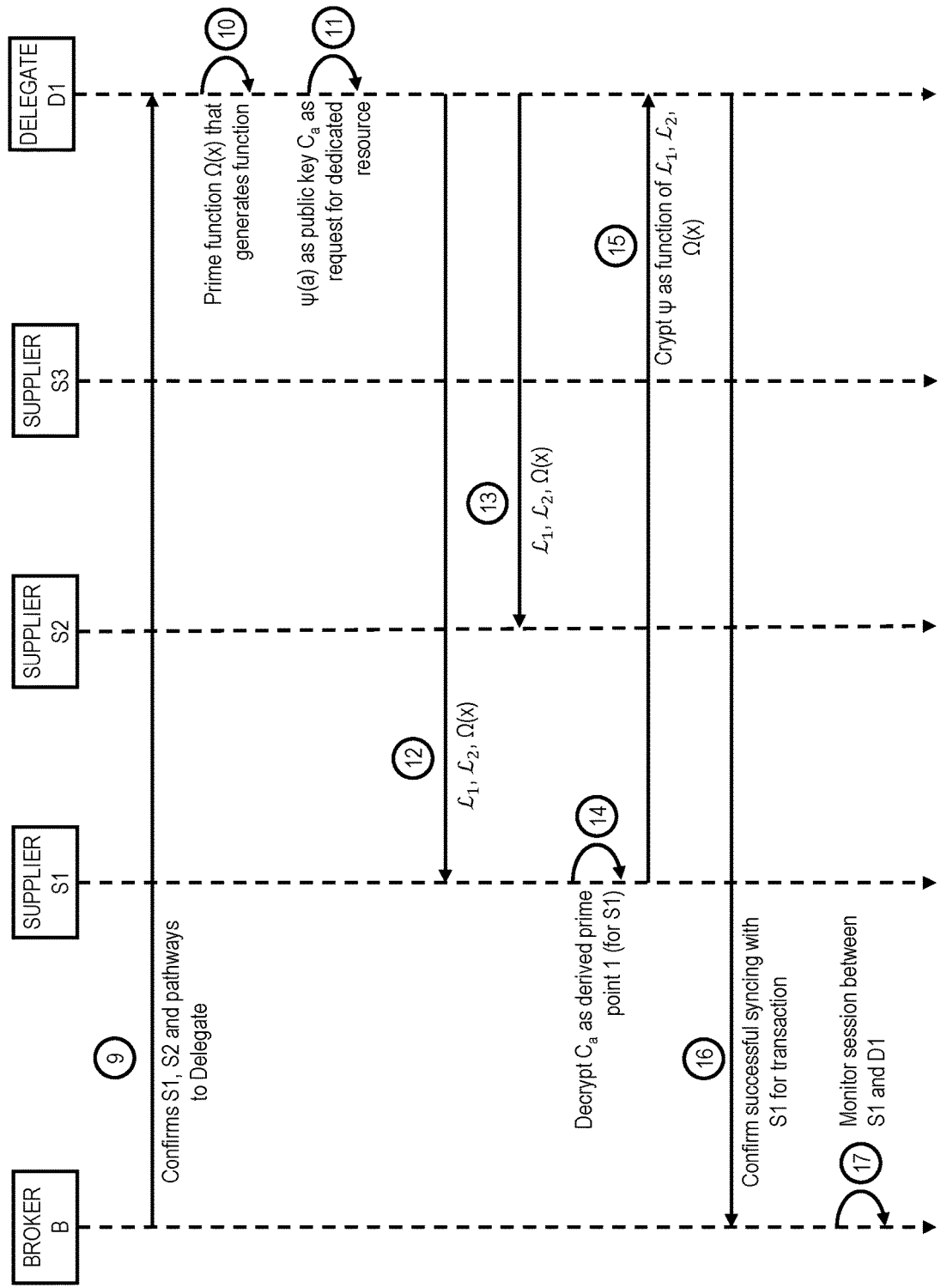

FIGS. 1A-1B depict an example activity flow by a broker, delegate, and suppliers for establishing a session between the delegate and a supplier, in accordance with aspects described herein. Initially, in an aspect described herein, a puzzle in the form of a crypt operative is devised in which a broker device creates one or more bivariate t-degree polynomial(s) for pre-distribution of the keys by computing a finite-solution root-share. A given t-degree polynomial has multiple, non-imaginary roots—natural numbers that will solve the given polynomial, and these roots, as 'keys', can be pre-distributed to network members. t can be any desired number and may generally be based on the complexity desired and/or number of participating members. A 30-degree polynomial, for instance, can generate many millions of roots, and therefore accommodate a network of millions of members.

In a specific example of devising the crypt, the cooperative operative may be based on the use of a qualifier scheme, wherein n nodes obtain a finite-solution root-share (hereinafter abbreviated FSFR) of the t-polynomial in order to potentially reconstruct an initiator crypt y when called upon. This is done as part of activity to pre-distribute keys/tokens/root shares before the flow of FIG. 1A-1B or session commencement has started, to allow the supplier nodes when later contacted by a broker to solve the crypt (see FIG. 1A. Determination of the FSFRs is a tokenization process to establish a cooperative membership and thus will have a public rootshare that will be sent to the nodes. The nodes can use this to solve a crypt sent to it.

The broker creates a bivariate t-degree polynomial puzzle for pre-distribution of the keys. An example puzzle defined to have a finite set of unique solutions is created as:

$$\left\{ f(x, y) = \sum_{i,j=0}^{t} a_{ij} x^i y^j \right\} \underset{\text{finite}}{\Longleftarrow} F_q :: f(x, y) = f(y, x) \qquad \text{[Eq. 1]}$$

In Eq. 1, i, j are the pair of the delegate $D_i$ and supplier $S_j$ being denoted for a specific potential transaction/session instance;

x, y are the bivariate variables that drive the polynomial;

$F_q$ is the finite field that covers the polynomial being solved for the prime number q;

q is a large prime number such that it accommodates a cryptographic key;

t is the degree of the polynomial that acts as a threshold for non-compromising nodes $N_c$ within the network such that $N_c \leq t$; and a is a scalar gradient that acts as the coefficient for the polynomial.

The puzzle many be defined in terms of a common key that will be used for supporting the membership. For each node $D_i$ (whether its role will be a delegate or a supplier when a transaction is initiated), the broker computes the finite-solution root-share (FSFR) for the delegate as follows:

$$f(x, y)_{i>0, j>0} = \begin{cases} f(i, y), & f(i, j) = f(j, i) \\ f(j, y), & f(i, j) = f(j, i) \end{cases} \quad \text{[Eq. 2]}$$

Thus, for any two nodes i and j, node i can compute the common key f(i, j) by evaluating f(i, y) at point j, and node j can compute the same key f(j, i)=f(i, j) by evaluating f(j, y) at point i.

A single bivariate t-degree polynomial can be used for a single (and optionally multiple) transactions. In some embodiments, the broker generates a set F of bivariate t-degree polynomials over the finite field F q for use with multiple, discrete transactions to keep their cooperative membership networks compartmentalized.

The crypt may be solved to find the solvents/solutions (the FSFRs), which is referred to as the cooperative operative. Solving Eq. 1 for a crypt φ with (t-1) as follows that is yielded by the Lagrange interpolation:

$$\mho(x)_{x \approx \varphi} = \left( q_0 + q_1 x + \ldots + q_{t-1} x^{t-1} \right)_{q_0 = \varphi} \xrightarrow{yields} \sum_{i=1}^{t} \left( f(i) + \prod_{j=1, j \neq i}^{t} \frac{x-i}{i-j} \right) \quad \text{[Eq. 3]}$$

In Eq. 3:
Ω(x) is the cooperative operative that is considered as the solution for the crypt φ, which can be sent by the suppliers to the broker B. The broker solves the crypt once to determine the right solutions, which are used as references/solvents to lookup 'solutions' received from the suppliers to see if the received 'solutions' are, in fact, correct to prove conformance;

q is the set of random, uniform, independent coefficients such that initial position is the crypt φ is satisfied, i.e. to produce equivalence in the equation;

t is the degree of the polynomial, and to find the solutions of that polynomial one would utilize the Lagrange polynomial interpolation;

$q_0$ is the first harmonic (zeroth degree solution for the crypt) which should solve the crypt—in practical terms this is used to mask the solution being found as number 1 (as 1 is a natural solvent for all crypts).

The above is the final step of fully defining the crypt, and its finite solutions are found via the Lagrange interpolation.

A cooperative operative between the broker and each supplier may be built because in practice it may not be difficult to assume that suppliers behave as honest and reliable participants. Hence, in a case of unavailability or non-cooperative behavior of a supplier, a retransmission operation, optionally preceded by a new supplier assignment, might need to take place, which creates additional latency.

An aspect in which a broker creates an individual puzzle and sends it to suppliers proceeds as follows: The broker creates a puzzle of Ω(x) for x from 1 to t (see Eq. 6 below) and sends the individual puzzles as Ω(i).

Referring to FIG. 1A, at 1 the broker B creates a crypt on a known number. Each member to be part of the 'network' has a token (e.g. FSFR; a root share corresponding to the crypt). At 2, 3, 4, the broker sends the crypt to supplier(s) in the vicinity—here three suppliers S1, S2, S3.

Each supplier then solves the 'puzzle' based on a derived agreed prime number, i.e. the unique, pre-distributed key/token that was previously provided to the supplier. For instance, each supplier solves for Ω(i) to obtain the $\psi_i$ as shown by Eq. 4 below based on the derived agreed prime number w which becomes the member of the cooperative operative set Ω(x) to establish the cooperative memberships and enforce the right operatives. In FIG. 1A, supplier S1 solves at 5 and returns its result (crypt φ) at 6, and supplier S2 solves at 7 and returns its result (crypt φ) at 8. It is noted that the different 'crypt w' results returned by the responding suppliers are different solutions on account that the different suppliers have different unique tokens/keys/root shares with which they solved the broker's puzzle to obtain their respective solutions.

The suppliers send their results to the broker B and broker B can understand based on this result the token that each supplier had and used to obtain that returned result based on the puzzle that the broker sent to the supplier (for instance the broker can take the crypt it sent and operate using it and the received results from the supplier to arrive that the corresponding token).

By Eq. 4, the puzzle is solved by the supplier using the supplier's unique and agreed-upon prime number (token) to demonstrate that the supplier is a confirmatory member of this cooperative. The resultant (N'i) is a solvent of the crypt and is a member of the solvent FSFR set that is provided by Eq. 3 above.

$$\left[ \frac{\varphi^{\mho(0)_{i_0}}}{\psi} \right]_{\psi \neq 0} = \left[ \frac{\psi^{\mho(x)_{x \approx \varphi_i}}}{\psi} \right]_{\psi \neq 0} \xrightarrow{yields} \psi_i \quad \text{(Eq. 4)}$$

In Eq. 4, $\psi_i$ is derived from the cooperative prime function using a prime function point computation of Eq. 4.

With this derivation, all the entities/elements that complete the cooperative set are obtained: $\{\Omega(i), \psi, \psi_i, \varphi_i\}_{t \geq i > 0}$.

Thus, the solved $\psi_i$ from Eq. 4 is sent by each prospective supplier to the broker B (at 6 and 8 in FIG. 1A). It is noted that supplier S3 did not respond and therefore is, for purposes of this session creation, unavailable.

As noted, the broker B can accept from each supplier its solvent (result) and validate whether the result is a member of the broker's solvent set. Checking whether a supplier's result is correct provides for authentication of the supplier. Unreturned or incorrect returned solvents identify 'nonconforming' nodes (such as supplier S3 in this case since it did not respond).

The broker B can then solve the respective crypt from each supplier as follows to check whether the supplier is a conforming node:

$$\psi_i = \left[ \frac{\varphi^{\mho(x)_{x \approx \varphi_i}}}{\psi} \right]_{\psi \neq 0} \xrightarrow{for\ i} \left[ \frac{\varphi^{\mho(i)_{c_i}}}{\psi} \right]_{\psi \neq 0} \quad \text{[Eq. 5]}$$

Each correctly solved $\psi_i$ indicates a member/conforming node in the cooperative and each unsolved, incorrectly solved, or unreturned $\psi_i$ indicates a nonconforming node $N_c$.

The above is used to prove to the broker that the supplier can be trusted. A crypt is sent to the supplier and the supplier is to perform an inverse of the operative. The broker can also perform the function to identify the solvent that is expected. The chances of a byzantine node solving the crypt 'correctly' (in that it sends back the right answer) is so low that a correct answer is sufficient to prove trust and thus the broker identifies which nodes are (i) trusted and (ii) available. This builds the cooperative operative that establishes membership for each supplier and the protocol so that a delegate can connect to a confirming supplier of a given resource within the network.

Thus, in accordance with aspects described, the flow to this point can be conceptualized as follows: The broker creates a generic puzzle such that there are unique tokens and for each unique token there is a unique counterpart to that token in terms of a solution to the puzzle. The broker distributes a unique token to each node of a collection of nodes. Based on a request by a delegate to the broker for brokerage of a transaction, the broker sends the generic puzzle to a collection of candidate suppliers (nodes on the network, each with one of the unique tokens). Each candidate supplier has a token and 'solves' the puzzle using its token. That produces a result that is sent back to the broker. The broker solves that result to obtain a value. If the supplier has and used a valid token, then the result that the supplier calculated and sent to broker will be a unique counterpart to the supplier's unique token. The broker receives the supplier's solution, and solves that to determine a value. If the value is a root of the polynomial), then the supplier can be regarded as trusted/conforming. Continuing, a node cannot possibly or practically solve the broker's puzzle to produce the correct result to send back to the broker unless the node is conforming. In other words, a non-conforming node is unable to provide to the broker the correct result for the counterpart value of a valid token because of the complexity involved.

Referring to FIG. 1B, at this point in the flow the broker knows that supplier S1 and supplier S2 are available members. It indicates this to the delegate D at 9. At this point, an efficient pathway is built from the requester/delegate D to a supplier in order to create the session. The pathway from the requester/delegate to a supplier may be established by an intersection inverse in the union of a compounded function, and the result is a pathway value such that one and only one element is an exact match when solving from the delegate to the supplier. In other words, once the pathway is established between a supplier and the delegate, only one supplier has the finite root share which has been endorsed by the delegate and only that supplier has and can use/provide (for instance as a cryptographic key) the finite root share that the delegate is using for that transaction. This provides a 1-to-1 pathway for the two to communicate with each other. In examples, the session between the delegate and supplier cannot be broken unless they both agree on it.

Thus, in one aspect (at 10) the delegate establishes an encryption generation function for the suppliers. This defines the encryption keys for private and public partitions ($L_1$ and $L_2$) of a cyphertext (also referred to herein as "cypher text") to facilitate the transaction. Call this the encryption set, denoted $Q(x)$ and represented as follows:

$$f(\Omega(x)^a, \Omega(i)^b) = f(\Omega(x), \Omega(i)^{a,b}) \forall a,b \in Z_q | \Omega(x), \Omega(i) \in C \quad [\text{Eq. 6}]$$

In Eq. 6, $Z_q$, C are both cyclic groups of the same prime order q being denoted through the membership pair indices being referred to as a and b, respectively. Here, a and b belong to two different cyclic groups and form number-pairs. They provide a mathematical way to ensure that they solve the same problem but belong to non-intercepting regions. The delegate D1 will use the generation function to request some dedicated resource.

As the prime intercept would work for both groups, we assume that suppliers are housed in C while the delegates are managed under $Z_q$.

Delegate A can be identified in the cooperative with public key $\psi_a$(11) and communicate to establish requests/responses using the private key $_1{}^i\psi_a$ operatives.

The Delegate D1 can then place its session request cryptically as $L_1$ with a created resource request operative. The session request for the dedicated resource can be called $C_a$.

$$L_1 = (C_a Z^r, \Omega(x)^{ar}) \quad [\text{Eq. 7}]$$

$L_1$ is the session request in encrypted form and is built by the delegate. In Eq. 7:
  $L_1$ is the first part of the multi-part cypher text;
  $C_a$ is the unencrypted/'plaintext' request for use of the dedicated resource;
  $Z \in Z_q$ and is defined as a function on the finite field $F_q$;
  r is a random number, with $r \in Z_q$ A part of the solution (referring to the 'b' corresponding to 'a', or 'b given a') is computed and sent cryptically to the supplier, and the value of Z is computed as a nested function as follows:

$$Z^{br} = (\Omega(x)^{ar}, \Omega(x)^{ba})_{yeilds} \Leftrightarrow L_2 \quad [\text{Eq. 8}]$$

In Eq. 8, $L_2$ is the second part of the cypher text and is the actual request being made of the dedicated resource (for instance a call for current temperature).

$C_a$ is the session request for a use of the dedicated resource. Eq. 9 mathematically defines $C_a$ as a numerical value. This value tells a supplier that the delegate wants to request something, e.g. use of the resource. This is the approach to facilitate the specific request (as $L_2$) regarding a resource, for instance a request for the supplier to respond with the current temperature as captured by the supplier from a thermometer. Conceptually, the $C_a$ is akin to an open ticket requesting service and remaining open until served. In some embodiments, given this is a non-obligatory network, once a supplier accepts such a request by extracting $C_a$ from a first part ($L_1$) of the cypher text, the supplier is now locked to that request and cannot accept another request (at least with respect to the target resource of the first request) until the 'ticket' is closed/serviced.

Returning to FIG. 1B, the delegate will use the generation function (cypher text portions $L_1$ and $L_2$) to request a dedicated resource, and therefore at 12 and 13 sends the function itself and the key(s) to the (two) suppliers that were identified to the delegate by the broker at 9. It may be the case that the delegate D1 needs more than one supplier for its request, though in this example the delegate D1 needs just one supplier and will use the one that responds faster. Whichever of supplier S1 and supplier S2 is available first or has more compute power is expected to solve the faster and return.

In this example, supplier S1 is the first to decrypt the function (at 14). This decryption and a subsequent response by the supplier ultimately allows the delegate to retrieve a clear 'handshake' with the supplier to establish and persist (at least for this session) a pathway to the addressable resource from the supplier. The handshake is the root share of the supplier S1. Supplier S1's root share is known to supplier S1 and ascertained by the delegate so they can use that to communicate, and what supplier S1 sends back to the delegate D1 proves that supplier S1 has a valid 'token' because it is a valid root share of the t-degree polynomial, i.e. it sits in the finite solution field.

Accordingly, at 14 of FIG. 1B, the supplier S1 determines the request $C_a$ using the $L_2$ partition from the cypher text to retrieve $C_a$ as:

$$C_a = \frac{\left[\prod_{r=1}^{a} \mathcal{L}_1\right]_{C_a = C_1}}{\prod_{b=1}^{r} (\mathcal{L}_2) a} \quad \text{[Eq. 9]}$$

At this point, the request may be correctly decrypted by supplier S1 and the response returned by the supplier S1 to delegate D1 proving conformity as detailed below.

Establishing the access pathway between the supplier S1 and delegate D1 involves checking whether one and only one element is an exact match when solving for i from 1, . . . , n in the following:

$$\int \{C_a \cap C_i \Big| \bigcup_{i=1}^{n} \left[ \frac{\left[\prod_{r=1}^{a} \mathcal{L}_1\right]_{C_a = C_1}}{\prod_{b=1}^{r} (\mathcal{L}_2)^a} \right] = 1 \}_{i<n} \quad \text{[Eq. 10]}$$

$C_a$ is used by an intersection inverse in the union of the compounded function shown in the Eq. 10. The decrypted $C_a$ should have an intersection in the known set. If this condition is satisfied, a session can be initiated or established between the supplier S1 and the delegate D1. If the intersection proves to be a null set, the session will be not established, indicating that the supplier is non-conforming/compromised and does not understand the resolution of the request $C_a$.

Thus, at 15 supplier S1 sends to delegate D1 a crypt as a function of $L_1$, $L_2$, and $Q(x)$, and therefore the delegate knows the root share of supplier S1 by way of the crypt sent back. The response pathways can also be limited in that the payload can structurally be analogous as that of request. The critical request payload components for proving trust may be found again in a response payload and the delegate knows now the root share of S1 to interpret the response. This secret root share can therefore be used as an encrypting mechanism for their ongoing communications of the session and therefore no other device can meaningfully interpret the exchanges between the supplier S1 and delegate D1 on the communication channel between them.

The above can be performed for each of different suppliers if desired, though in particular examples, the delegate selects and attempts to establish the session with the supplier that responds first. Assuming the delegate D1 identifies a trusted supplier, the delegate D1 confirms with the broker successful syncing with the supplier (e.g. at 16). This proves the delegate can communicate securely with the supplier and the supplier has proven that it is trustworthy. The session can then progress, e.g. with, perhaps another request by the delegate, for instance a follow up request involving the resource, a request for a response regarding the request made of the resource, or a request for retransmission of the response, as examples. In some embodiments, the session includes just one transaction (request-response pair) in which delegate D1 makes a request and supplier S1 provides a response to that request.

Using the example above in which a delegate (e.g. sprinkler system) requests a temperature reading, the delegate sends (at 12) to the supplier a request for the current temperature, the supplier responds (at 15) with the requested temperature encrypted by its own root share, and the delegate uses that root share (which it already knows from the handshake) to decrypt the response. The delegate can thereafter (in any particular order) perform its task with the current temperature and inform the broker that the network (session created between the delegate and supplier) is dismantled.

At 17 the broker can 'monitor' the session in that it can be apprised of this session termination, for instance by way of a termination indication from the delegate D1 to the broker indicating that the session has been terminated.

A supplier is to satisfy the prime generating function prerequisite, otherwise it is a non-conforming or compromised node within the operative. This has at least the following advantages. First, the decryption allows the delegate to retrieve a clear handshake and retain a pathway to the addressable resource from the supplier. Second, this saves additional hops that would otherwise had to have been made with the broker. In an obligatory network, the links are generally trusted and exchange of various trust-providing crypts as in accordance with the features of this disclosure are not necessary—the request to a destination internet protocol (IP) address hops to the destination across potentially multiple hops. In contrast, the approach herein involves one hop in either direction (delegate-supplier), and (in some embodiments) the transaction is relatively short (one request, one response), enabling fast dismantling of the session between supplier and delegate to enable the supplier to service other requests or undertake its own tasks. Orchestration is minimized, in that direct communication between two parties is more efficient than communication through multiple hops. Third, this approach protects exposing the broker in the cooperative and therefore reduces threat probability within the open system. Fourth, it allows the cooperative to self-learn of compromised/non-confirming nodes, thus creating a trust ecosystem.

Prior to the flow in FIG. 1B, identification of the broker and initiation of the broker's activities can be effected in any of various ways. For instance, delegate D1 could send a communication to a last-known broker and/or high performance node(s) on the network to initiate a supplier search. Additionally or alternatively the broker could broadcast itself to network devices informing of the broker's presence and that it is available to facilitate session establishment between delegates and suppliers. When an existing broker ceases to act as such, another network device might step up to act as a broker.

To establish trust of a broker, for instance to delegates and suppliers, any of various approaches may be taken. In one such approach in which a delegate joins the network, a handshake is performed between the delegate and broker. The handshake can help identify a situation in which one or both of a supplier and broker working with the supplier are byzantine nodes. Thus, an initial broker-delegate handshake can be built on a consensus framework where the delegate device communicates a defined range function to a collection of more than one node and each node of the collection solves for the range function and delivers its answer to the delegate. The nodes are expected to return the same solution. The nodes that have provided the consensus solution (for example an idempotent range function scalar plane) are taken as legitimate brokers as they comply with the solution plane. The other nodes are taken as non-conforming. In this manner, aspects described herein can be provided to prove trust between collections of parties regardless what their role(s) will eventually be later transactions/sessions, which roles can vary from transaction to transaction if their resources so allow.

As also noted, devices may take on various roles concurrently or serially, and therefore one or more suppliers might act as brokers for some transactions and suppliers for others.

Figure 2:
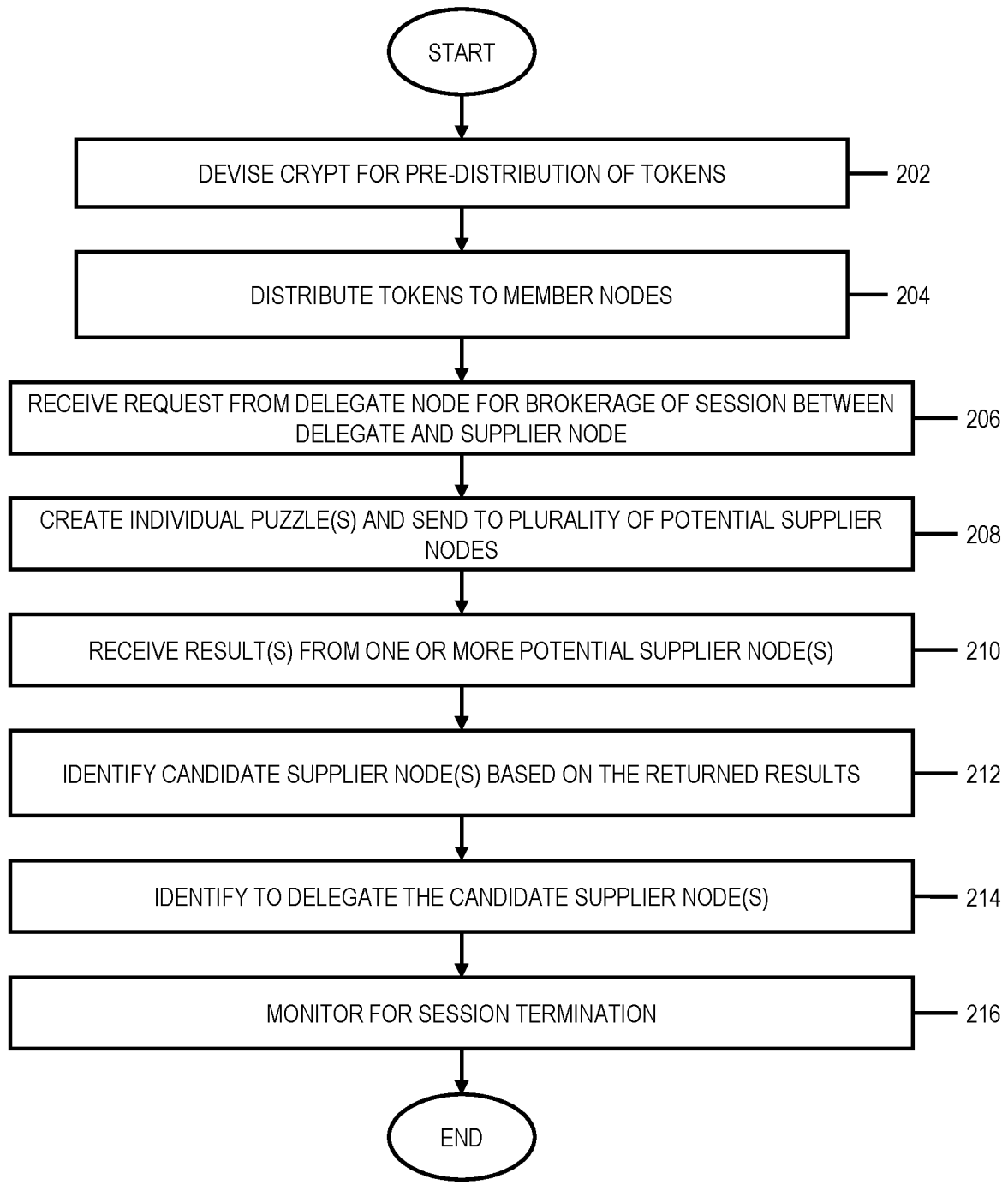
FIG. 2 depicts an example process for facilitating an electronic communication session in a network, in accordance with aspects described herein.

FIG. 2 depicts an example process for facilitating an electronic communication session in a network, in accordance with aspects described herein. In some examples, the process is performed by one or more computer systems, such as those described herein, which may include a broker device of a network.

The process begins by devising (202) a crypt for pre-distribution of tokens to facilitate electronic communication sessions in a network. In examples, devising the crypt includes determining bivariate t-degree polynomials with a finite set of unique solutions as finite solution root shares, where the distributed tokens are at least some of those finite solution root shares. The broker could determine, for each member node of the member nodes of the network, a respective finite solution root share for the member node to distribute to the member node. In examples, determining the finite solution root share uses Lagrange polynomial interpolation.

The process distributes (204) the tokens to member nodes of the network, where each member node receives a respective unique token of the tokens. At some point, the broker receives (206) a request from a delegate node of the network for brokerage of a session between the delegate node and a supplier node of the network. Based on the request, the process creates and sends (208), for each potential supplier node of a plurality of potential supplier nodes of the network, a respective individual puzzle for the potential supplier node based on the devised crypt. Since the function is polymorphic, the potential suppliers can 'solve' the same individually. Each of one or more of the potential suppliers receives and solves the individual puzzle from the broker using the supplier's respective token to obtain a result and sends back the result to the broker.

The process then receives (210), from each of the one or more potential supplier nodes of the plurality of potential supplier nodes, a respective result obtained by the potential supplier node from solving the individual puzzle using the token distributed to the potential supplier.

The process then identifies (212), based on the receiving, one or more candidate supplier nodes of the one or more potential supplier nodes as a potential supplier for the session with the delegate node, and identifies (214) to the delegate node the one or more candidate supplier nodes for the session with the delegate node.

In particular examples, the creating and the sending creates and sends a respective individual puzzle to a potential supplier node, where the potential supplier node fails to respond with a result. On this basis, the process can further include regarding the potential supplier node as non-conforming and excluding the potential supplier node from the one or more candidate supplier nodes.

Additionally or alternatively a respective result received from a potential supplier node as part of the receiving can include another crypt. The process can further include decrypting that another crypt to obtain a decrypted result for comparison to a reference of conforming solution(s) (one example is a known token for the potential supplier node). A mismatch between the decrypted result and the reference of conforming solution(s) (for instance the known token) can indicate non-conformance of the potential supplier node to a cooperative membership of the network.

In some embodiments, the delegate node receives an indication of the one or more candidate supplier nodes for the session with the delegate node, determines an encryption set (e.g. from Eq. 6) and a multi-part cyphertext (e.g. as $L_1$ and $L_2$ from Eq. 7 and 8, respectively), where a first part of the cyphertext encodes a request for the resource, and sends the encryption set and multi-part cyphertext to the identified one or more candidate supplier nodes. Based on a candidate supplier node receiving the encryption set and multi-part cyphertext from the delegate node and decrypting the encoded request from a second part of the cyphertext to obtain a decrypted result, the delegate node receives the decrypted result from the candidate supplier node, and determines, based on the decrypted result sent by the candidate supplier node, whether the candidate supplier node is a conforming node. Based on determining that the candidate supplier node is a conforming node, the delegate can confirm with the broker the session between the delegate and candidate supplier node, where supplier node and delegate node communications of the session are encrypted based on the token distributed to the candidate supplier node.

Returning to the process of FIG. 1, the process monitors (216) for termination of the session receiving from the delegate node and indication of termination of the session.

In particular examples, the session comprises a single request-response pair followed by termination of the session.

The one or more candidate supplier nodes can include a hardware/software resource that the delegate node lacks. The session can thus be to request use of the resource (such as collection of a value using a hardware sensor of the supplier and providing the value to the delegate) by the delegate and provide use of the resource by a candidate supplier node (e.g. via a response to the request). Additionally or alternatively, the one of more candidate supplier nodes can include Internet-of-Things (IoT) sensor(s) and the delegate can include an IoT device, as examples.

Although various examples are provided, variations are possible without departing from a spirit of the claimed aspects.

Figure 3:
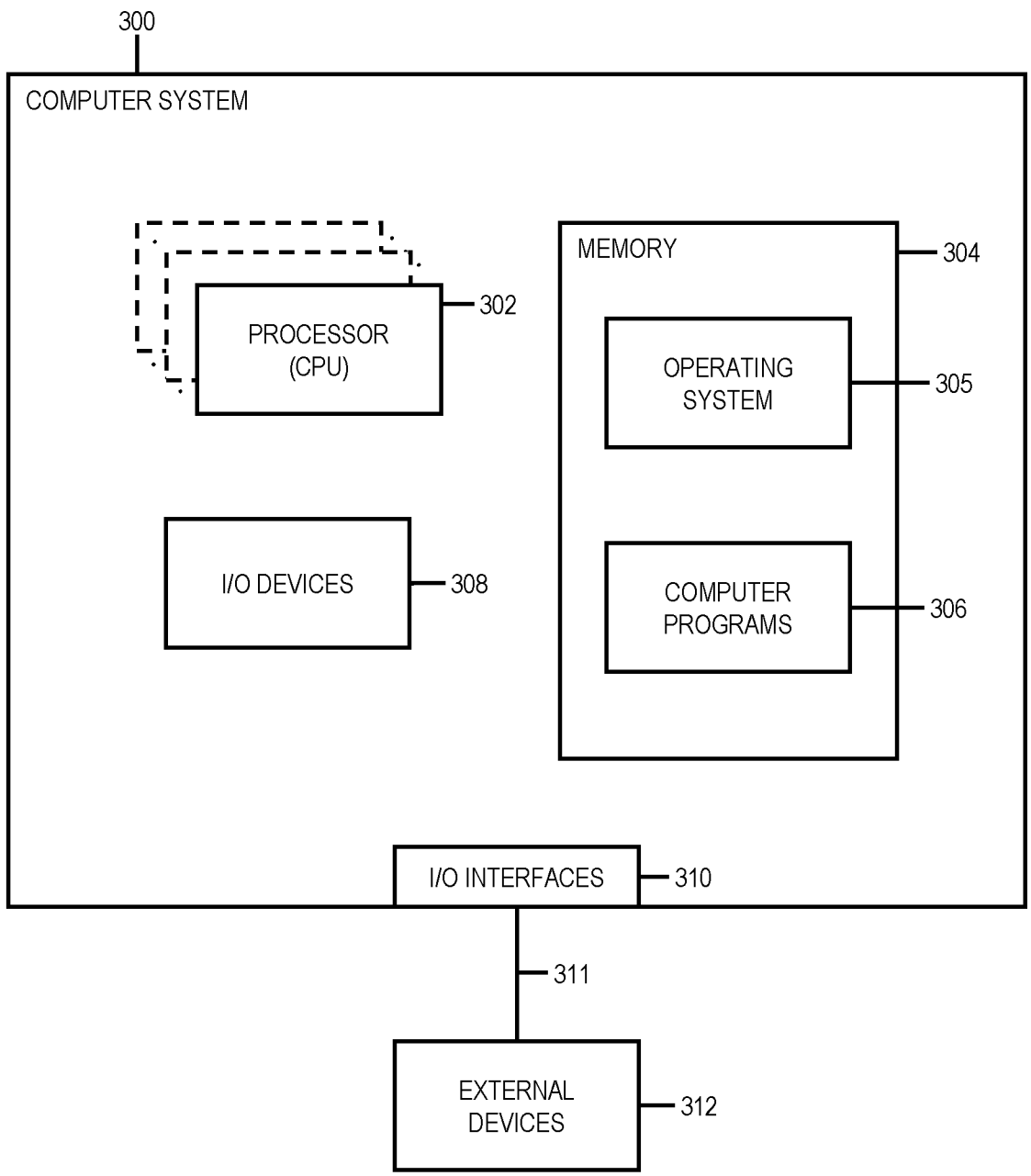
FIG. 3 depicts one example of a computer system and associated devices to incorporate and/or use aspects described herein.

Processes described herein may be performed singly or collectively by one or more computer systems, such as one or more brokers, delegates, suppliers, or a combination of the foregoing, as examples. FIG. 3 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 3 shows a computer system 300 in communication with external device(s) 312. Computer system 300 includes one or more processor(s) 302, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 302 can also include register(s) to be used by one or more of the functional components. Computer system 300 also includes memory 304, input/output (I/O) devices 308, and I/O interfaces 310, which may be coupled to processor(s) 302 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 304 can be or include main or system memory (e.g. Random Access Memory) used in the execution of program instructions, storage device(s) such as hard drive(s), flash media, or optical media as examples, and/or cache memory, as examples. Memory 304 can include, for instance, a cache, such as a shared cache, which may be coupled to local caches (examples include L1 cache, L2 cache, etc.) of processor(s) 302. Additionally, memory 304 may be or include at least one computer program product having a set (e.g., at least one) of program modules, instructions, code or the like that is/are configured to carry out functions of embodiments described herein when executed by one or more processors.

Memory 304 can store an operating system 305 and other computer programs 306, such as one or more computer programs/applications that execute to perform aspects described herein. Specifically, programs/applications can include computer readable program instructions that may be configured to carry out functions of embodiments of aspects described herein.

Examples of I/O devices 308 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (312) coupled to the computer system through one or more I/O interfaces 310.

Computer system 300 may communicate with one or more external devices 312 via one or more I/O interfaces 310. Example external devices include a keyboard, a pointing device, a display, and/or any other devices that enable a user to interact with computer system 300. Other example external devices include any device that enables computer system 300 to communicate with one or more other computing systems or peripheral devices such as a printer. A network interface/adapter is an example I/O interface that enables computer system 300 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 310 and external devices 312 can occur across wired and/or wireless communications link(s) 311, such as Ethernet-based wired or wireless connections. Example wireless connections include cellular, Wi-Fi, Bluetooth®, proximity-based, near-field, or other types of wireless connections. More generally, communications link(s) 311 may be any appropriate wireless and/or wired communication link(s) for communicating data.

Particular external device(s) 312 may include one or more data storage devices, which may store one or more programs, one or more computer readable program instructions, and/or data, etc. Computer system 300 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 300 may be operational with numerous other general purpose or special purpose computing system environments or configurations. Computer system 300 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
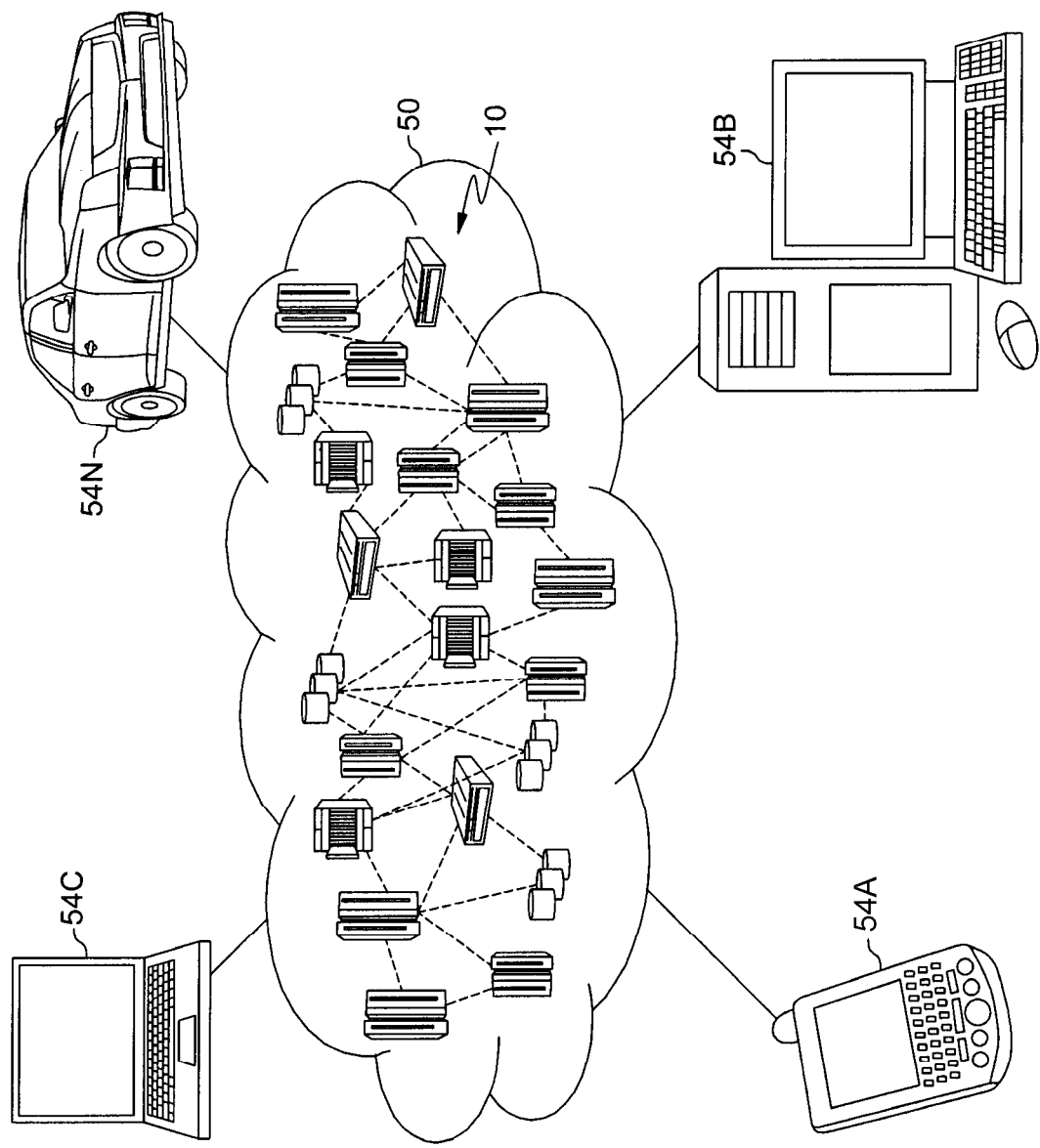
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
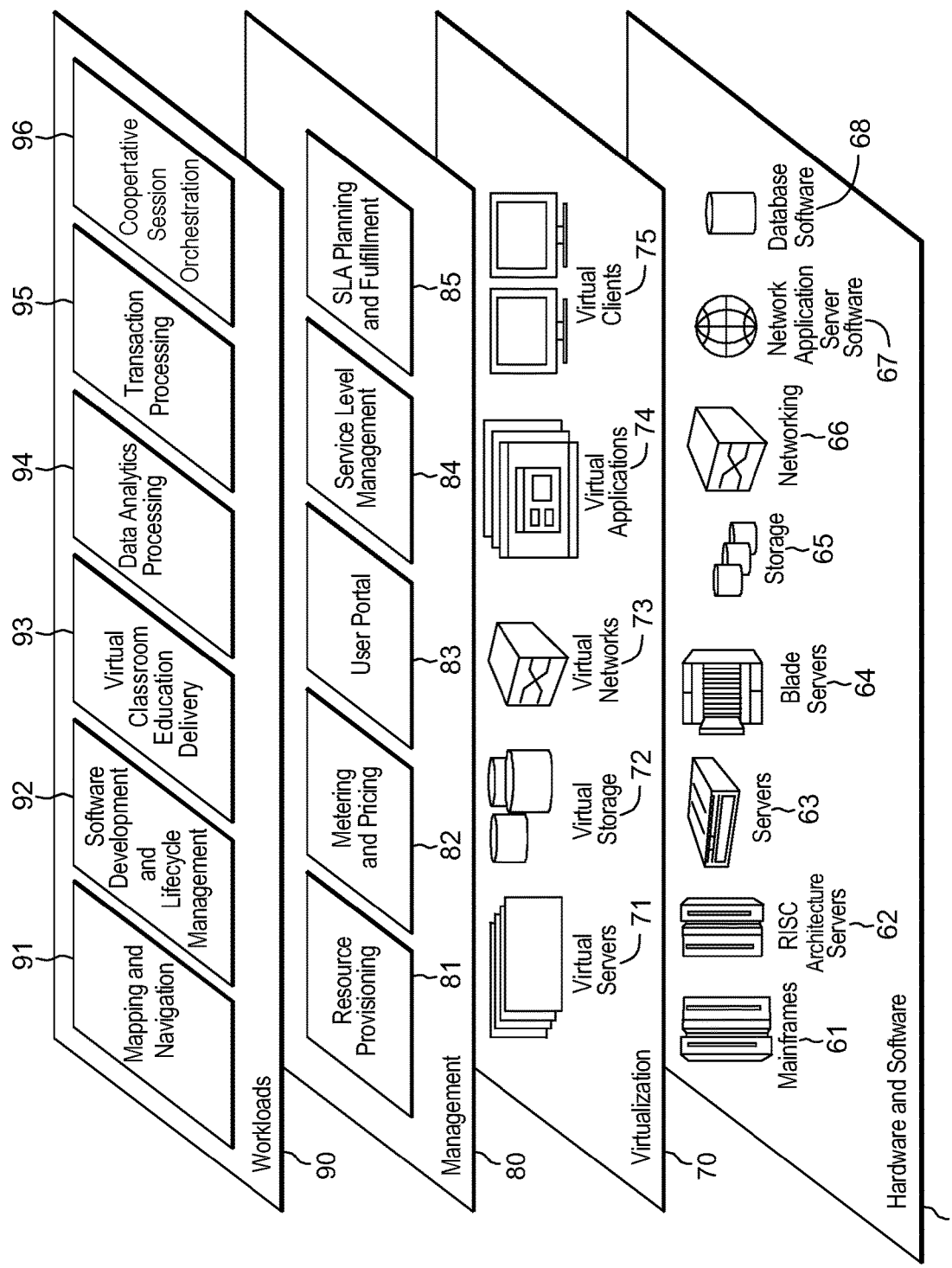
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cooperative session orchestration 96.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided.

The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer implemented method comprising:
   devising a crypt for pre-distribution of tokens to facilitate electronic communication sessions in a non-obligatory network, the tokens being keys facilitating computationally solving the crypt;
   distributing the tokens to member nodes of the network, wherein each member node receives a respective unique token of the tokens, in which each token of the tokens is distributed to only one member node;
   based on a request from a delegate node of the network for brokerage of a session between the delegate node and a supplier node of the network, where the supplier node is one of a collection of supplier nodes offering a resource requested by the request and communications of the session are encrypted based on the token distributed to the supplier node, creating, for each potential supplier node of a plurality of potential supplier nodes of the network, a respective individual puzzle for the potential supplier node based on the devised crypt, and sending the individual puzzle to the potential supplier node;
   receiving, from each of one or more potential supplier nodes of the plurality of potential supplier nodes, a respective result obtained by the potential supplier node from solving the individual puzzle using the token distributed to the potential supplier;
   identifying, based on the receiving, one or more candidate supplier nodes of the one or more potential supplier nodes as a potential supplier for the session with the delegate node; and
   identifying to the delegate node the one or more candidate supplier nodes for the session with the delegate node.

2. The method of claim 1, wherein devising the crypt comprises determining a bivariate t-degree polynomial with a finite set of unique solutions as finite solution root shares, the distributed tokens being at least some of the finite solution root shares.

3. The method of claim 2, further comprising determining, for each member node of the member nodes of the network, a respective finite solution root share for the member node.

4. The method of claim 3, wherein determining the finite solution root share uses Lagrange polynomial interpolation.

5. The method of claim 1, wherein the creating and the sending creates and sends a respective individual puzzle to a potential supplier node, wherein the potential supplier node fails to respond with a result, and wherein the method further comprises, based on the potential supplier node failing to respond, regarding the potential supplier node as non-conforming and excluding the potential supplier node from the one or more candidate supplier nodes.

6. The method of claim 1, wherein a respective result received from a potential supplier node as part of the receiving comprises another crypt, wherein the method further comprises decrypting the another crypt to obtain a decrypted result for comparison to a reference of conforming solutions.

7. The method of claim 6, wherein a mismatch between the decrypted result and the reference of conforming solutions indicates non-conformance of the potential supplier node to a cooperative membership of the network.

8. The method of claim 1, wherein the delegate node receives an indication of the one or more candidate supplier nodes for the session with the delegate node, determines an encryption set and a multi-part cyphertext, wherein a first part of the cyphertext encodes a request for the resource, and sends the encryption set and multi-part cyphertext to the identified one or more candidate supplier nodes.

9. The method of claim 8, wherein based on a candidate supplier node receiving the encryption set and multi-part cyphertext from the delegate node and decrypting the encoded request from a second part of the cyphertext to obtain a decrypted result, the delegate node receives the decrypted result from the candidate supplier node, determines, based on the decrypted result sent by the candidate supplier node, whether the candidate supplier node is a conforming node, and based on determining that the candidate supplier node is a conforming node, confirms with the broker the session between the delegate and candidate supplier node.

10. The method of claim 1, wherein the session comprises a single request-response pair followed by termination of the session.

11. The method of claim 1, further comprising monitoring for termination of the session, and receiving from the delegate node an indication of termination of the session.

12. The method of claim 1, wherein the one or more candidate supplier nodes comprise a hardware or software resource that the delegate node lacks, and wherein the session is to request use of the resource by the delegate and provide use of the resource by a candidate supplier node.

13. The method of claim 12, wherein the one of more candidate supplier nodes comprise one or more Internet-of-Things (IoT) sensors and wherein the delegate comprises an IoT device.

14. A computer system comprising:
a memory; and
a processor in communication with the memory, wherein the computer system is configured to perform a method comprising:
devising a crypt for pre-distribution of tokens to facilitate electronic communication sessions in a non-obligatory network, the tokens being keys facilitating computationally solving the crypt;
distributing the tokens to member nodes of the network, wherein each member node receives a respective unique token of the tokens, in which each token of the tokens is distributed to only one member node;
based on a request from a delegate node of the network for brokerage of a session between the delegate node and a supplier node of the network, where the supplier node is one of a collection of supplier nodes offering a resource requested by the request and communications of the session are encrypted based on the token distributed to the supplier node, creating, for each potential supplier node of a plurality of potential supplier nodes of the network, a respective individual puzzle for the potential supplier node based on the devised crypt, and sending the individual puzzle to the potential supplier node;
receiving, from each of one or more potential supplier nodes of the plurality of potential supplier nodes, a respective result obtained by the potential supplier node from solving the individual puzzle using the token distributed to the potential supplier;
identifying, based on the receiving, one or more candidate supplier nodes of the one or more potential supplier nodes as a potential supplier for the session with the delegate node; and
identifying to the delegate node the one or more candidate supplier nodes for the session with the delegate node.

15. The computer system of claim 14, wherein devising the crypt comprises determining bivariate t-degree polynomials with a finite set of unique solutions as finite solution root shares, the distributed tokens being at least some of the finite solution root shares.

16. The computer system of claim 15, wherein the method further comprises determining, for each member node of the member nodes of the network, a respective finite solution root share for the member node, wherein determining the finite solution root share uses Lagrange polynomial interpolation.

17. The computer system of claim 14, wherein the delegate node receives an indication of the one or more candidate supplier nodes for the session with the delegate node, determines an encryption set and a multi-part cyphertext, wherein a first part of the cyphertext encodes a request for the resource, and sends the encryption set and multi-part cyphertext to the identified one or more candidate supplier nodes, and wherein based on a candidate supplier node receiving the encryption set and multi-part cyphertext from the delegate node and decrypting the encoded request from a second part of the cyphertext to obtain a decrypted result, the delegate node receives the decrypted result from the candidate supplier node, determines, based on the decrypted result sent by the candidate supplier node, whether the candidate supplier node is a conforming node, and based on determining that the candidate supplier node is a conforming node, confirms with the broker the session between the delegate and candidate supplier node.

18. The computer system of claim 14, wherein the one or more candidate supplier nodes comprise a hardware or software resource that the delegate node lacks, and wherein the session is to request use of the resource by the delegate and provide use of the resource by a candidate supplier node.

19. The computer system of claim 18, wherein the one of more candidate supplier nodes comprise one or more Internet-of-Things (IoT) sensors and wherein the delegate comprises an IoT device.

20. A computer program product comprising:
a computer readable storage medium readable by a processing circuit and storing instructions for execution by the processing circuit for performing a method comprising:
devising a crypt for pre-distribution of tokens to facilitate electronic communication sessions in a non-obligatory network, the tokens being keys facilitating computationally solving the crypt;
distributing the tokens to member nodes of the network, wherein each member node receives a respective unique token of the tokens, in which each token of the tokens is distributed to only one member node;
based on a request from a delegate node of the network for brokerage of a session between the delegate node and a supplier node of the network, where the supplier node is one of a collection of supplier nodes offering a resource requested by the request and communications of the session are encrypted based on the token distributed to the supplier node, creating, for each potential supplier node of a plurality of potential supplier nodes of the network, a respective individual puzzle for the potential supplier node based on the devised crypt, and sending the individual puzzle to the potential supplier node;
receiving, from each of one or more potential supplier nodes of the plurality of potential supplier nodes, a respective result obtained by the potential supplier node from solving the individual puzzle using the token distributed to the potential supplier;
identifying, based on the receiving, one or more candidate supplier nodes of the one or more potential supplier nodes as a potential supplier for the session with the delegate node; and
identifying to the delegate node the one or more candidate supplier nodes for the session with the delegate node.

* * * * *